Patented Dec. 7, 1926.

1,610,167

UNITED STATES PATENT OFFICE.

WILHELM SCHMITZ, OF BERLIN, GERMANY, ASSIGNOR TO THE TINOLAN COMPANY OF AMERICA, INC., OF NEW YORK, N. Y., A CORPORATION OF NEW YORK.

INSECTICIDE AND PROCESS FOR PREPARING THE SAME.

No Drawing.      Application filed August 18, 1923. Serial No. 658,176.

Many preparations recommended as protectives against the ravages of moths and other insects are merely repellents, which by their disagreeable odor or fumes are supposed to keep such insects away from woolen materials, furs, hairs, papers, plants or any other material which is subject to their attack. In this repellent class are e. g. naphthalene, camphor, tar, thymol, oil of turpentine, oil of cedarwood etc. These chemicals at best repel but do not actually exterminate the injurious insects so that same can continue their pernicious activities in other places less well protected. For exterminating purposes poisons or poison-compounds are generally used such as preparations of arsenic, copper, lead, chrome and their compounds or caustic substances as well as poisonous fumes. These are dangerous to human beings and domestic animals and have to be applied with the greatest of care.

To obtain efficient extermination of house, garden and field insects and at the same time protect by special treatment all materials subject to their attack, the process described below has been developed. It offers effective means for combating these destructive pests. From vegetable matter substances are obtained which possess strong insecticidal properties. These while extremely effective for the purpose intended, have no injurious effects whatsoever on human beings, domestic animals and on the materials to be protected. Saponin-glucosides derived from the Sapindaceæ, Rosaceæ or Caryophyllaceæ families and alkaloid containing seeds of Leguminosæ plants such as belonging to families Papilionaceæ or Spartieæ are extracted with a diluted inorganic acid (sulphuric acid excepted). The solution is then neutralized and concentrated to a thick consistency to which a sodium salt is added until a solid is obtained which is converted into powder form. The product so obtained embodies as active principles the acids of the saponin-glucosides and the alkaloid bases of the seeds in the form of organic salts and neutral saponins, also the sodium salt of the inorganic acid used in the process of extraction. This new product will act destructively on house, garden and field insects by causing inflammation of the respiratory organs, decomposition of the blood cells, paralysis of the body and interruption of the digestive process. The ferment by which some of these insects are able to convert food is acted upon and in consequence all food assimilation will cease.

A specific method of preparation is as follows:—quillai bark and seeds of genus Lupinus (albus, angustifolius, luteus, niger or perennis) are extracted at a temperature of about 120° F. with a diluted inorganic acid (sulphuric acid excepted). For better yield this process can be repeated. The extracted solution is then separated from the vegetable residue and is neutralized with sodium carbonate (indicator: litmus). It is then concentrated by evaporation to a sirupy consistency and after cooling sodium sulphate is added until a solid mass is formed which is then converted into powder form. The product is soluble in water and is applied for instance by saturating material to be treated for protection in a 1% solution for a short time and then drying same. The effective substances in such solution will penetrate into the cells of the material in a finely divided state, where they are precipitated and fixed by the action of the special properties of this product. After drying a positive and lasting protection is obtained as has been proven by practical tests conducted over lengthy periods. The product can also be applied in powder or paste form, hot or cold, alone or with other substances, on the material to be protected.

The special advantages are that it is harmless, has no odor and is non-volatile. It is easily applied with great effectiveness on a large and small scale and is economical. Valuable materials such as wool, furs, hairs, paper, plants, etc. are in a simple way protected efficiently against destructive house, garden and field insects, which are doing enormous damage throughout the year. At the same time these latter are effectively destroyed.

I claim:
1. A process of making an insecticide, which comprises extracting quillai bark and seeds of genus Lupinus with an inorganic acid, adding sodium sulphate to the extracted matter to form a solid mass, and pulverizing the mass.

2. A product consisting of salts of alkaloids from seeds of Lupinus, with saponins of quillaia and the sodium salt of an inorganic acid.

In testimony whereof I affix my signature to this specification.

WILHELM SCHMITZ.